Dec. 20, 1955 J. J. BIEBIGHAUSER 2,727,724
FISHING APPARATUS
Filed July 14, 1952 2 Sheets-Sheet 1
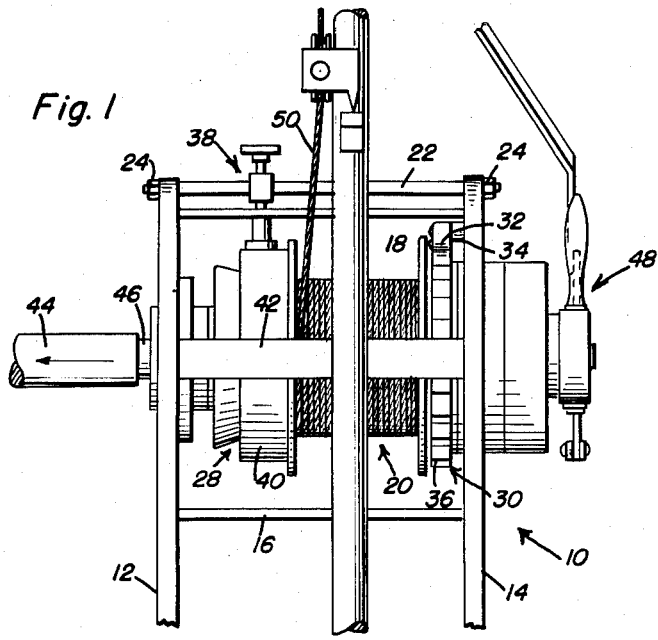
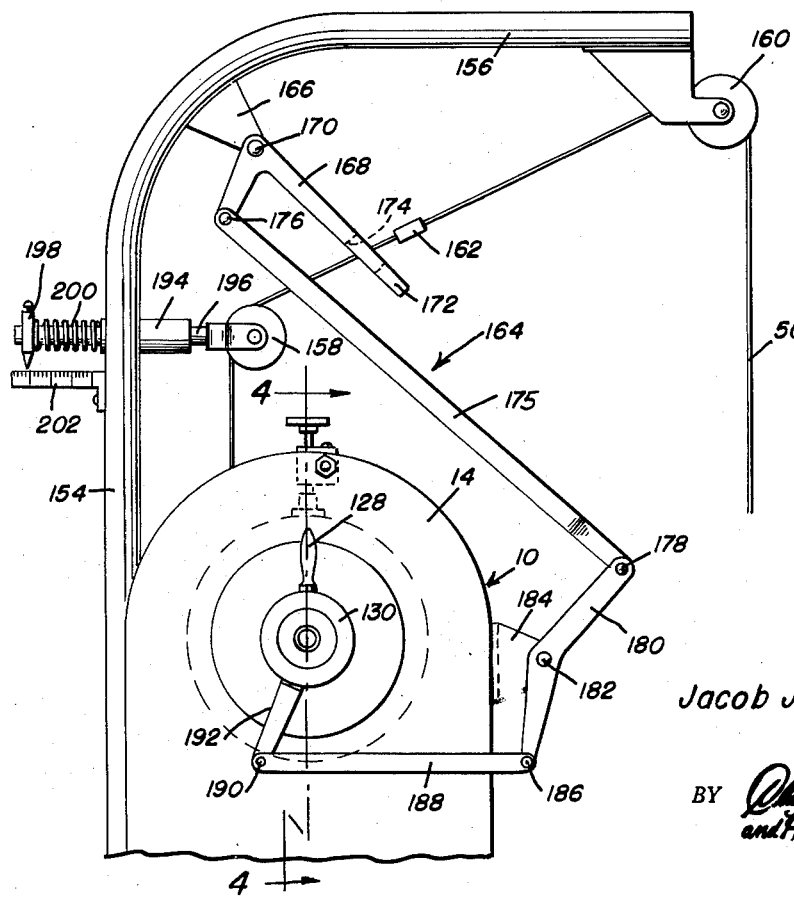
Jacob J. Biebighauser
INVENTOR.

Dec. 20, 1955     J. J. BIEBIGHAUSER     2,727,724
FISHING APPARATUS
Filed July 14, 1952     2 Sheets-Sheet 2

Jacob J. Biebighauser
INVENTOR.

United States Patent Office 2,727,724
Patented Dec. 20, 1955

2,727,724

FISHING APPARATUS

Jacob J. Biebighauser, Pensacola, Fla.

Application July 14, 1952, Serial No. 298,695

7 Claims. (Cl. 254—173)

The present invention relates to fishing apparatus and more particularly relates to an improved power driven fishing reel and line guiding means.

In general, the invention is to provide an improved fishing apparatus that will control a wire or other fishing line accurately in deep water fishing. In deep water fishing, the water currents at times run in different directions and with a hand line it is often necessary to extend the line for forty or fifty fathoms in order to sink the line thirty fathoms in the water. By using the power driven reel and its associated apparatus of the present invention it is possible to utilize a wire line which is much smaller than the conventional cotton line, will consequently be less affected by these currents than a conventional cotton line and which will be taken readily by slow biting fish which ordinarily will not take a cotton line. Further, by utilizing a wire line in conjunction with a power driven reel, it is possible to add extra weight to the line to even further prevent the line from straying due to the currents in the water. Also, with the present invention, it is possible to profitably catch fish in much deeper water, the deeper the more advantageous, a procedure that is impossible when utilizing a hand line.

A primary object of the present invention is to provide a power driven reel that may be quickly and simply started, stopped, or allowed to run freely by a single actuating means.

Another object of the invention, ancillary to the primary object, is the provision of a power driven fishing reel wherein one end of the reel spool constitutes a brake drum and the other end of the reel constitutes a clutch seat, which reel spool may be conveniently slid along a drive shaft for selected engagement and disengagement with a clutch and brake shoe.

Still another object of the present invention is to provide a power driven reel wherein a sliding spindle is provided to engage the reel spool with a driving means, disengage the reel spool from the driving means and further engage the reel spool with a braking means.

It is a further object of the invention, ancillary to the preceding objects, to provide the sliding spindle with a threaded end with a sleeve surrounding this threaded end whereby the rotation of the sleeve will slide the spindle.

Yet another object of the present invention is to provide a power driven reel that is provided with a novel snubbing and ratchet arrangement whereby the rotation of the reel spool may be further controlled.

It is also an object of the invention to provide a fishing line guiding means that will automatically gauge the approximate weight of the line payed out from the fishing reel.

A last object of the invention to be mentioned specifically is the provision of an automatic reel control means that is associated with the fishing line guiding means and interconnected with a power driven reel whereby when a predetermined amount of line is wound upon the reel the automatic reel control means will stop the reel and prevent any more line from being wound thereon.

These, together with various ancillary objects and features of the invention which will later become apparent as the following description proceeds, are attained by the device, a preferred embodiment of which has been illustrated by way of example only in the accompanying drawings, wherein:

Figure 1 is a front elevational view of the fishing apparatus of the present invention showing the power driven reel and a portion of the line guiding means;

Figure 2 is a side view of the fishing apparatus of the invention showing the power driven reel, the line guiding means and the automatic reel stopping means associated with the line guiding means;

Referring now to the accompanying drawings in detail, it will be noted that like reference characters are utilized to designate like parts throughout the various views of the drawings as the following description proceeds.

Figure 3:
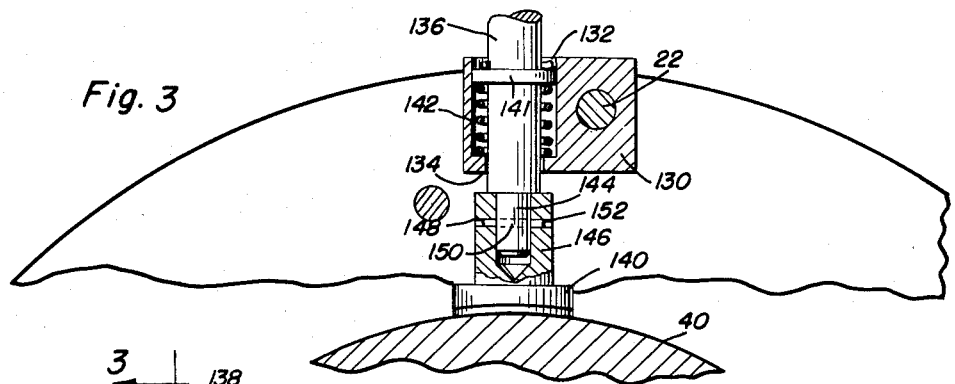
Figure 3 is a sectional view of the reel snubbing device of the invention taken substantially along section line 3—3 of Figure 4.
Figure 4:
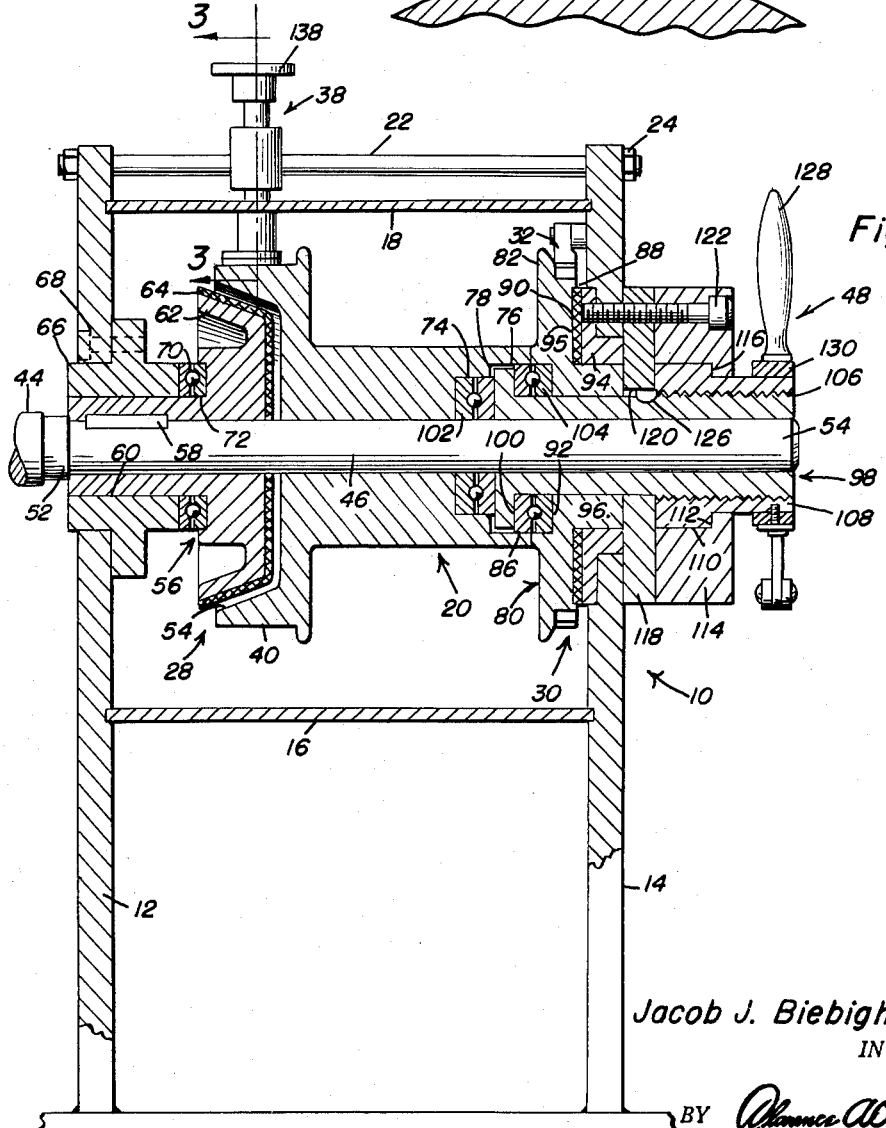
Figure 4 is a cross sectional view of the power driven reel of the invention taken substantially along section line 4—4 of Figure 2.

Referring first to Figures 1, 3 and 4 of the drawings, the construction and operation of the power driven reel will be clearly observed. The power driven reel is designated in its entirety by the numeral 10 and comprises generally a pair of spaced, supporting standards 12 and 14 held in spaced relation to one another by a pair of vertically spaced spacing bars 16 and 18 respectively, between which the reel spool 20 is mounted. At the upper ends of the standards 12 and 14 is secured a spacing rod 22 which is secured at its ends to the supporting standards by any conventional means such as nuts 24. One end of the reel spool 20 is provided with clutch means 28 while the other end of the reel spool 20 is provided with brake means 30, the construction of which will be described hereinafter. On the standard 14 adjacent the brake means 30 of the reel spool 20 is mounted a lug 32 which is pivoted to a sleeve 34 projecting from the inner surface of the standard 14. Ratchet teeth 36 are formed on this end of the reel spool 20 to prevent movement of the reel spool in one direction when the ratchet lug 32 is pivoted into engagement with these teeth. At the other end of the reel adjacent the clutch means 28, a reel snubber 38 is mounted on the spacing rod 22 to engage the annular rim or flange 40 formed on this end of the reel spool 20 to control the unwinding of the reel spool 20. Additional spacer bars 42 are secured at their ends to the standards 12 and 14 at the forward and rearward edges thereof to further enclose the reel spool and to additionally protect an operator from inadvertently coming in contact with the reel spool when the same is in operation. A driving shaft 44 is connected to the drive shaft 46 of the reel 10 and is connected to a source of power (not shown) for driving the reel spool 20 when the clutch means 28 is engaged. Operating means 48 is mounted on the outer surface of the standard 14 for selectively moving the reel spool 20 into and out of engagement with the brake and clutch means for paying out the line 50 wound on the spool 20.

Referring particularly to Figure 4 of the drawings, the details of construction of the power driven reel 10 and the operation thereof will now be described. Drive shaft 46 is rotatably journaled on the standards 12 and 14 and extends therebetween. The ends 52 and 54 of the drive shaft 46 are disposed exteriorly of the standards 12 and 14 respectively with the end 52 being enlarged at its connection to the driving shaft 44. The spool 20 is freely rotatable upon the shaft 46 and is provided at its end adjacent the standard 12 with an annular flange 40, previously mentioned, which forms a part of the clutch means 28. The annular flange 40 has an inwardly flared shoulder 54 thereon forming an outwardly opening recess at this end of the spool. Keyed to the shaft 46 adjacent the end 52 thereof is a clutch or driving cone 56 as by key 58. This clutch 56 comprises a hub 60 having an enlarged frusto-conical shaped rim 62 at one end thereof having a shape complementary to the recess formed by the annular flange 40 on the one end of the reel spool 20. A clutch plate 64 is secured to the rim 62 and is adapted to seat in the recess formed by the annular flange 40 in a manner presently to be described. Bushing 66, secured to the supporting standard 12 in any suitable manner as by bolts 68 journals the hub 60 and consequently the drive shaft 46 on the standard 12 while antifriction bearings 70 are mounted in the bearing race 72 formed between the bushing 66 and the clutch rim 62.

The other end of the spool 20 is provided with a bore 74 and an enlarged counterbore 76 forming an internal shoulder 78 therebetween. Rigidly fixed to this end of the spool 20 is a brake drum 80, one face of which 82 constitutes a line guiding means for the spool 20. Where the brake drum 80 joins the end of the spool 20, the drum is provided with a bore 86 of the same configuration as counterbore 76 on the end of the reel spool 20. The other face 88 of the brake drum 80 is provided with an annular groove 90 which is adapted to seat against the brake shoe 94 mounted on the standard 14.

As will be noted in Figure 4, the brake shoe 94 is fixedly secured to the supporting standard 14 and also serves as a bushing for rotatably journaling the hub 96 of the brake drum 80 on the standard 14.

Slidably mounted on the end 54 of the shaft 46 is a sliding spindle 98 having an enlarged end 100 abutting the internal shoulder 78 formed in the one end of the spool 20. Antifriction bearings 102 and 104 are mounted in the bores 74 and 92 respectively and engage the enlarged end 100 of the sliding spindle 98 therebetween for preventing movement of this end of the spindle with respect to the spool 20. The other end of the spindle 98 is disposed exteriorly of the standard 14 and is externally threaded as at 106. An internally threaded sleeve 108 is threaded on to the threaded end 106 of the spindle 98 and includes an enlarged inner end 110 providing an external shoulder 112. An annular ring 114 surrounds the end 110 of the sleeve 108 and is provided with an internal shoulder 116 abutting the external shoulder 112 of the sleeve 108. Interposed between the ring 114 and the exterior surface of the supporting standard 14 is a washer 118 having a keyway 120 therein for a purpose that will immediately become apparent. Common fastening means such as bolts 122 secure the annular ring 114, washer 118 and combination brake shoe and bushing 94 in fixed relation on the standard 14; thus, the sleeve 108 is permitted to rotate within the annular ring 114 but is prevented against axial movement longitudinally of the drive shaft 46.

A key 126 fixes the sliding spindle 98 within the keyway 120 to prevent the spindle from revolving upon action of the drive shaft 46. The key 126 is smaller than the keyway 120 in order to permit the spindle 98 to slide axially along the drive shaft 46 upon rotation of the sleeve 108. Handle 128 is mounted on the smaller end of the sleeve 108 as by a band 130 in order to manually rotate the sleeve 108 causing the spindle 98 to slide along the drive shaft 46.

As shown in Figure 4, the key 126 is slid all the way to the right in abutting engagement with the enlarged end 110 of the sleeve 108. In this position, the brake shoe 94 and its associated lining 95 are in engagement with the face 88 of the brake drum 80 thereby holding the spool 20 in an inoperative position. By actuating the sleeve 108 by means of the handle 128, the spindle 98 may be moved to a position where the key 126 is in engagement with the end of the brake drum 80 whereby the clutch plate 64 is in seating engagement in the recess formed on the other end of the reel spool 20 whereby the reel spool will be drivingly actuated for rotatable movement with the drive shaft 46. When the spindle 98 is slid to a position intermediate the ends of the brake drum 80 and the sleeve 108, the reel spool 20 will be disengaged from both the brake shoe and the clutch plate and permitted to freely rotate on the shaft 46. By this arrangement, the spool 20 may be operatively engaged with the drive shaft 46 for reeling in the wire line 50 mounted thereon, may be selectively disengaged from the clutch 56 and braked for stopping the reel spool or may be selectively disengaged from both the clutch means 28 and the brake means 30 permitting the reel spool to freely pay out line by simply manipulating the actuating handle 128. When the line has been payed out to the desired depth, but it is not desired to use the brake means 30, the pawl or ratchet lug 32 may be pivoted into engagement with the ratchet teeth 36 on the exterior surface of the brake drum 80 to prevent further downward movement of the line. To control the speed with which the line is payed out, the reel snubber 38 is employed to frictionally seat against the annular flange 40 on the reel spool 20.

The reel snubber 38 is mounted on the spacing rod 22 by means of a block 130 having an upwardly opening recess 132 therein and an aperture 134 communicating the bottom of the recess 132 with the exterior of the block. The reel or thumb snubber 38 comprises a plunger rod 136 having a thumb button 138 mounted at the upper end thereof and a snubbing plate 140 mounted at the lower end thereof. Intermediate its ends and disposed within the recess 132 of the block 130, the plunger rod 136 is provided with an enlarged annular flange 141. A coil spring 142 concentrically surrounds the plunger rod 136 and is seated at its lower end on the bottom of the recess 132 and at its upper end against the annular flange 141 to normally bias the snubbing plate 140 out of engagement with the annular flange 40 of the reel spool 20.

At its lower end, the rod 136 includes a reduced terminal portion 144. A vertically extending boss 146 is mounted on the snubbing plate 140 into which the reduced end portion 144 is disposed. Aligned transverse bores 148 and 150 are provided in the boss 146 and the reduced end portion 144 respectively and a pin 152 is disposed in these aligned transverse bores to secure the snubbing plate 140 to the lower end 144 of the plunger rod 136.

The present invention also contemplates an improved line guiding and automatic stopping means for use with the above described power driven reel and reference will now be had to Figure 2 for an understanding of this portion of the invention.

A pole 154 extends vertically behind the power driven reel 10 and has an upper horizontally extending section 156 overlying and extending forwardly of the power driven reel 10. Guide pulleys 158 and 160 are mounted on the vertically extending portion 154 and the horizontally extending portion 156 of the pole respectively and the line 50 is entrained from the reel 10 over these guide pulleys. The line 50 is provided with a ball or other enlargement such as a weight 162 which is adapted to engage an automatic actuating means 164 for stopping the reel spool 20.

This automatic actuating means comprises a lug 166 projecting inwardly from the pole 154 adjacent the junction of the horizontal and vertical portions of the pole. A trigger 168 is pivotally mounted intermediate its ends on the lug 166 as by a pivot pin 170. The end 172 of the trigger 168 is formed with an eye or slotted portion 174 through which the line 50 passes so that the line enlargement 162 is disposed above the trigger 168. As shown in Figure 2, the trigger 168 is in the form of a lever having an elongated arm and a shorter arm angularly connected therewith with the trigger being pivoted to the lug 166 at the junction of these arms. At the end of the short arm of the trigger 168, an elongated link 175 is pivoted as at 176. The other end of the link 175 is pivoted to a bellcrank 180 which is in turn pivoted intermediate its ends as at 182 to a lug 184 projecting from the supporting standard 14. The other end of the bellcrank 180 is pivotally connected as at 186 to a link 188 which is in turn pivotally connected at its other end as by pin 190 to the stop control lever 192 mounted on the band 130.

In operation, when the line 50 is wound upon the reel spool 20, the enlargement 162 will eventually contact the end of the trigger 168 as the line passes through the eye 174 in the trigger. When the enlargement 162 contacts the trigger, the trigger will be pivoted about the pivot pin 170 thus pulling the link 175 upward thereby rotating the bellcrank 180 and through the link 188 pulling the automatic stop control lever 192. When the automatic stop control lever 192 is thus pulled, the sliding spindle 98 will draw the brake drum 90 of the reel spool 20 into engagement with the brake shoe 94 thereby stopping further movement of the spool 20 and consequently preventing further winding of the line 50 on the spool.

In order to approximately gauge the weight of a fish which may strike the line 50, the pulley 158 is specially mounted on the pole 154. To accomplish this mounting, the pole 154 is provided with a sleeve 194 through which the shaft 196 extends. One end of the shaft 196 is provided with a U-shaped yoke upon which the pulley 158 is mounted. The other end of the shaft 196 is provided with a pointer 198 and a coil spring 200 is concentrically wound around the shaft 196 and seats at its ends against the pointer and the sleeve 194 to urge the shaft attached to pulley 158 toward the pole 154. A weight gauge 202 is mounted on the pole adjacent the pointer 198 and upon exerting a pull upon the line 50, the pulley 158 will be pulled away from the vertical portion of the pole 154 and the pointer 198 will register the weight increase caused by such pulling on the gauge 202 whereby the approximate weight of a fish attached to the line 50 may be easily and quickly gauged.

From the foregoing description, the construction and operation of the fishing apparatus of the present invention is believed to be clearly set forth. However, since numerous modifications and changes will occur to those skilled in the art after a consideration of the foregoing description taken in conjunction with the accompanying drawings, it is not desired to limit the invention to the exact construction shown and described, but all suitable modifications may be resorted to which fall within the scope of the appended claims.

Having described the invention, what is claimed as new is:

1. A power driven fishing reel comprising a rotatable drive shaft, a spool rotatably mounted on said drive shaft, brake and clutch means adapted to engage opposite ends of said spool, operating means axially slidable on and rotatably journaling one end of said drive shaft including a portion thereof extending within said spool and engaging said spool and moving the same into and out of engagement with said brake and clutch means, and means for rotating said drive shaft.

2. A power driven fishing reel comprising a rotatable drive shaft, a spool rotatably mounted on said drive shaft, a brake and clutch means adapted to engage opposite ends of said spool, operating means for selectively moving said spool into and out of engagement with said brake and clutch means, and means for rotating said drive shaft, said operating means comprising a spindle slidably and rotatably journaling one end of said drive shaft and having one end portion thereof housed within said spool, said spool being rotatably journaled on said one end portion of said spindle and being connected to said spindle for axial movement therewith, actuating means on the other end of said spindle for reversibly sliding said spindle along said drive shaft and moving said spool into and out of engagement with said brake and clutch means, said spool having an enlarged internal annular recess therein and a smaller bore communicating said recess with one end of the bore, said spindle extending through said bore and having an enlarged end portion seating in said recess fixedly connecting said spindle and said spool.

3. A power driven fishing reel comprising a rotatable drive shaft, a spool rotatably mounted on said drive shaft, brake and clutch means adapted to engage opposite ends of said spool, operating means for selectively moving said spool into and out of engagement with said brake and clutch means, and means for rotating said drive shaft, said operating means comprising a spindle slidably and nonrotatably mounted on one end of said drive shaft, one end of said spindle being connected to said spool, actuating means on the other end of said spindle for reversibly sliding said spindle along said drive shaft and moving said spool into and out of engagement with said brake and clutch means, said clutch means including an annular flange on one end of said spool forming an outwardly opening recess, a clutch on said drive shaft adapted to frictionally seat in said recess, said actuating means including said spindle having a keyway therein, supporting means for said reel, a washer secured to said supporting means and having a key received in said keyway, a rotatable sleeve threadedly receiving a portion of said spindle, means fixing said sleeve against axial movement relative to said supporting means and means for rotating said sleeve to axially slide said spindle on said drive shaft.

4. A power driven fishing reel comprising a rotatable drive shaft, a spool rotatably mounted on said driveshaft, brake and clutch means adapted to engage opposite ends of said spool, operating means for selectively moving said spool into and out of engagement with said brake and clutch means, and means for rotating said driveshaft, said operating means comprising a spindle slidable on and rotatably journaling one end of said driveshaft, one end of said spool being rotatably journaled on said spindle and being fixedly attached to said spindle for axial movement therewith, actuating means on said spindle for reciprocably sliding said spindle along said driveshaft and moving said spool into and out of engagement with said brake and clutch means.

5. A power fishing reel comprising a rotatable driveshaft, a spool rotatably mounted on said driveshaft, brake and clutch means adapted to engage opposite ends of said spool, operating means for selectively moving said spool into and out of engagement with said brake and clutch means, and means for rotating said driveshaft, said operating means comprising a spindle slidable on and rotatably journaling one end of said driveshaft, one end of said spool being rotatably journaled on said spindle and being fixedly attached to said spindle for axial movement therewith, actuating means on said spindle for reciprocably sliding said spindle along said driveshaft and moving said spool into and out of engagement with said brake and clutch means, said brake means including a brake drum at one end of said spool, one face of said drum constituting a line guiding means for said spool, a brake shoe mounted adjacent the other face of said drum.

6. A power driven fishing reel comprising a rotatable driveshaft, a spool rotatably mounted on said driveshaft, brake and clutch means adapted to engage opposite ends of said spool, operating means for selectively moving said spool into and out of engagement with said brake and clutch means, and means for rotating said driveshaft, said operating means comprising a spindle slidable on and rotatably journaling one end of said driveshaft, one end of said spool being rotatably journaled on said spindle and being fixedly attached to said spindle for axial movement therewith, actuating means on said spindle for reciprocably sliding said spindle along said driveshaft and moving said spool into and out of engagement with said brake and clutch means, said clutch means including an annular flange on one end of said spool forming an outwardly opening recess, a clutch keyed to said driveshaft adjacent said one end and adapted to frictionally seat in said recess.

7. A power driven fishing reel comprising a rotatable driveshaft, a spool rotatably mounted on said driveshaft, brake and clutch means adapted to engage opposite ends of said spool, operating means for selectively moving said spool into and out of engagement with said brake and clutch means, and means for rotating said driveshaft, said operating means comprising a spindle slidable on and rotatably journaling one end of said driveshaft, one end of said spool being rotatably journaled on said spindle and being fixedly attached to said spindle for axial movement therewith, actuating means on said spindle for reciprocably sliding said spindle along said driveshaft and moving said spool into and out of engagement with said brake and clutch means, said brake means including a brake drum at one end of said spool, one face of said drum constituting a line guiding means for said spool, a brake shoe mounted adjacent the other face of said drum, said clutch means including an annular flange on one end of said spool forming an outwardly opening recess, a clutch keyed to said driveshaft adjacent said one end and adapted to frictionally seat in said recess.

References Cited in the file of this patent

UNITED STATES PATENTS

| | | |
|---|---|---|
| 2,295,932 | Campbell et al. | Sept. 15, 1942 |
| 2,326,935 | Ferguson | Aug. 17, 1943 |
| 2,335,568 | Lock | Nov. 30, 1943 |
| 2,434,138 | Adams | Jan. 6, 1948 |
| 2,515,434 | Zwald | July 18, 1950 |
| 2,525,402 | Dehn | Oct. 10, 1950 |
| 2,551,079 | Winther | May 1, 1951 |
| 2,596,318 | Willi et al. | May 13, 1952 |
| 2,603,474 | Mandolf et al. | July 15, 1952 |
| 2,619,322 | Comstock | Nov. 25, 1952 |